United States Statutory Invention Registration [19]

Antonuzzi et al.

[11] Reg. Number: H332

[43] Published: Sep. 1, 1987

[54] HIGH SPEED LOCK MECHANISM

[75] Inventors: Anthony P. Antonuzzi, Stoneham; William E. Hagel, Billerica; Donald M. Lawson, Lexington, all of Mass.; Richard S. Herman, Clifton, N.J.

[73] Assignee: The United States of America as represented by the Secretary of the Army, Washington, D.C.

[21] Appl. No.: 859,100

[22] Filed: Jan. 31, 1986

[51] Int. Cl.[4] ..... F42C 15/06

[52] U.S. Cl. ..... 310/78; 89/1.812; 192/44; 192/45.1

[58] Field of Search ..... 74/526; 89/1.812; 192/415, 43, 43.1, 43.2, 44, 45.2; 200/61.39; 310/49 R, 78, 83

[56] References Cited

U.S. PATENT DOCUMENTS 3,961,555 6/1976 Zellmer et al. ..... 89/1.812

*Primary Examiner*—Stephen C. Buczinski

*Assistant Examiner*—Linda J. Wallace

*Attorney, Agent, or Firm*—Anthony T. Lane; Harold H. Card, Jr.; Michael C. Sachs

[57] ABSTRACT

The invention relates to lock mechanisms by which a missile or analogous system may be prevented from undergoing an undesired launch or ignition. Specifically, the invention is a rotating lock mechanism which may be rotated in precise clockwise and counterclockwise steps by an electrical stepper motor or other source of precise rotation, in response to a predetermined sequence of electrical pulses.

2 Claims, 8 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

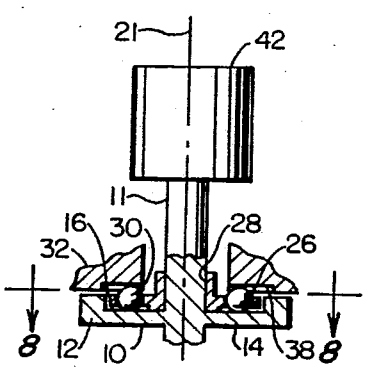
FIG. 1
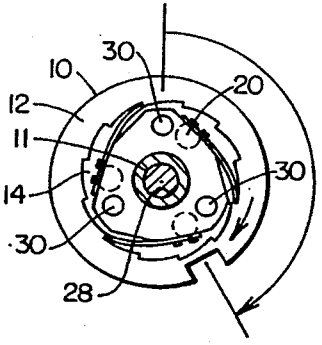
FIG. 2
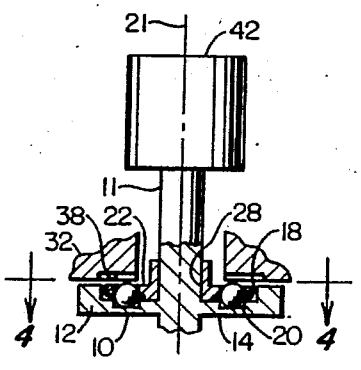
FIG. 3
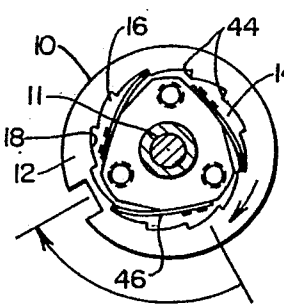
FIG. 4
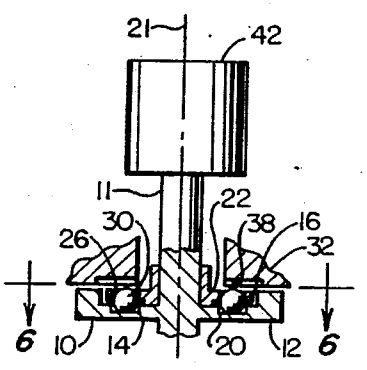
FIG. 5
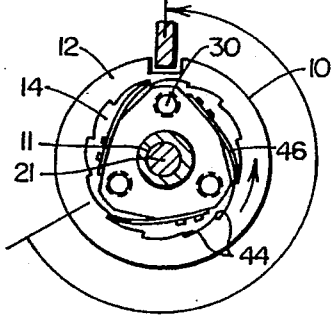
FIG. 6
FIG. 7
FIG. 8

HIGH SPEED LOCK MECHANISM

GOVERNMENTAL INTEREST

The Government has rights in this invention pursuant to contract DAAK-10-82-C-0315, awarded by the Department of the Army.

FIELD OF THE INVENTION

The invention relates to lock mechanisms by which a missile or an analogous system may be prevented from undergoing an undesired launch or ignition. In particular, the invention relates to such lock mechanisms driven by electrical motors.

BACKGROUND OF THE INVENTION

It is of paramount importance that a missile not undergo launch except when desired, and launch systems must be carefully designed to prevent the possibility of accidental launch. At the same time, a desired launch must not be delayed by any time-consuming procedures for releasing preventive lock mechanisms. Hence, it is desirable that an electrical locking system be used which may be rapidly disengaged at launch, but which may not be accidentally disengaged at other times due to accident, system malfunction or extraneous electrical power. A locking mechanism which could be disengaged merely by supplying electrical power to the mechanism would be subject to an unacceptable degree of likelihood of accidental disengagement. On the other hand, a system requiring a predetermined sequence of electrical pulses would have a very low probability of accidental disengagement, particularly where the electrical pulses are sequenced via a module which may be loaded into the system just prior to launch.

SUMMARY OF THE INVENTION

The present invention provides for such a pulsed electrical locking system. A stepper motor is particularly appropriate for use in such a mechanism, insofar as it allows for a specific predetermined rotation of the motor upon receipt of an electrical pulse. For instance, a stepper motor may rotate precisely 30° upon receipt of a single pulse, or 60° upon receipt of two pulses. Hence the present invention is a lock mechanism specifically designed for use with a source of rotational power such as the stepper motor, which may provide rotation in precise, constant steps in response to electrical pulses. This is accomplished using a circular locking mechanism, wherein the various functional members are located at multiples of 30° around a center axis.

More specifically, the lock mechanism provides for the use of three inflexible locking balls located 120° apart around a circle centered at the axis. A lock wheel is contoured with a void on one of its sides, which void holds a ball housing in which the three balls rest. The lock wheel furthermore has three holes through its interior portion, sized and spaced so as to be capable of receiving the balls. The lock wheel furthermore has a notch on its outer edge, which notch is capable of receiving the latch member of the locking mechanism so as to disengage the lock. A lock device fits over the lock wheel and ball housing, which lock device includes the latch member. The lock device furthermore has three holes sized and spaced so that they may engage the three balls, on the side of the ball housing opposite the lock wheel. Means are also provided for unidirectionally engaging the ball housing with the lock wheel, so that the lock wheel may rotate independently of the ball housing in a clockwise direction, and so that the ball housing rotates with the lock wheel in a counterclockwise direction.

The lock mechanism is designed so that when the three holes in the lock wheel are not in alignment with the balls so as to receive them, the balls remain engaged with the holes in the lock device. As a result, the lock wheel and ball housing cannot rotate in a counterclockwise direction. When the lock wheel is brought into alignment with the balls, the balls are free to disengage from the lock device. The ball cage and lock wheel are then free to rotate in a counterclockwise direction. The lock mechanism may therefore be used in conjunction with a stepper motor or other source of incremental rotational force, so that the lock wheel may rotate first in a clockwise direction so as to align with the balls and disengage them from the lock device, and then in a counterclockwise direction so as to move the notch into alignment with the latch member of the lock device. The lock is thus fully disengaged.

Objects of the invention will be clear from a review of the drawings and a reading of the description of the preferred embodiment which follow.

BRIEF DESCRIPTION OF THE DRAWINGS

FIG. 1 is an elevational view of the lock mechanism of this invention, partially in section, in the fully locked position.

FIG. 2 is a sectional view taken along line 2—2 of FIG. 2 and with the covering structure broken away to show the balls.

FIG. 3 is an elevational view of the lock mechanism of this invention, partially in section, after the first rotational unlocking step.

FIG. 4 is a top plan view of the lock mechanism of FIG. 3, partially in section, taken along line 4—4.

FIG. 5 is an elevational view of the lock mechanism of this invention, partially in section, in the fully unlocked position, after the second rotational unlocking step.

FIG. 6 is a top plan view of the lock mechanism of FIG. 5, partially in section, taken along line 6—6.

FIG. 7 is an elevational view of the lock mechanism of this invention, partially in section, after re-locking.

FIG. 8 is a top plan view of the lock mechanism of FIG. 7, partially in section, taken along line 8—8.

DETAILED DESCRIPTION OF THE PREFERRED EMBODIMENT

Looking to FIGS. 1 and 2, the locking mechanism includes a lock wheel 10 mounted co-axially on a shaft 11 has an outer portion 12 and an inner portion 14. The outer portion is thicker than the inner portion measured along the axis 21 of the shaft 11. A void 16 is formed between a surface 18 defining the innermost extent of said outer portion 12 and the shaft 11. The surface 18 extends parallel to the axis 21 of the lock wheel 10.

The lock wheel 10 has three indentations 20 into its inner portion 14, which indentations are spaced 120° apart and equidistant from the center or axis 21 of the lock wheel 10.

A circular ball housing 22 rests in the void 16 of the lock wheel 10, so that its outer edge 24 engages the surface 18. The ball housing 22 has three holes 26 through its interior which are of the same spacing as the indentations 20 of the lock wheel 10 so that they may align with the indentations 20.

The ball housing 22 further has a hole 28 through its center to fit the shaft 11.

There are three inflexible balls 30 for resting in the three holes 26 of the ball housing 22.

A part of the frame 32 fits over the lock wheel 10 and the ball housing 22.

The frame 32 further has three grooves 38 which are shaped and positioned so that they allow the three balls 30 to be displaced upward when the housing 22 is properly oriented.

The drive shaft 11 passes through the center hole 28 in the ball housing 22 and connects to the lock wheel 10. The other end of the drive shaft connects to a stepper motor 42. The shaft 11 and wheel 10 always rotate together. The housing remains stationary with frame 32 when the balls 30 are engaged in grooves 38. When the balls are not in grooves 38 the housing will be free to rotate in the counterclockwise direction with wheel 10.

The surface 18 of the void 16 of the lock wheel 10 is contoured with ratchet teeth 44. The outer edge 24 of the ball housing 22 has three pawl members 46 which mate with the ratchet teeth 44. Thus, the wheel cannot rotate in the counterclockwise direction unless the housing 22 is also free to rotate.

In FIGS. 1 and 2 the lock mechanism is shown in its lock position. The three holes 26 of the ball housing 22 are aligned with the three grooves 38 of the frame 32. The three balls 30 extend upwardly into the three grooves 38. The three indentations 20 of the lock wheel 10 are located 30° clockwise from the three holes 26 of the ball housing 22. The notch 36 in the outer edge of the lock wheel 10 is located 150° clockwise from a latch member 34 which is mounted to remain stationary with frame 32. When the wheel is rotated by a series of pulses to the position where latch member 34 and notch 36 are aligned, the latch member will drop into the notch and thereby release the holding or locking apparatus held in place by the periphery of the wheel 10.

In FIGS. 3 and 4, the lock mechanism is shown after the first step of the unlocking process. The lock wheel 10 has rotated 90° in the clockwise direction, so that the three indentations 20 are now aligned with the three holes 26 of the ball housing 22. Thus, the balls 30 can be transferred from engagement with the frame 32 and cammed into indentations 20 of the lock wheel 10 by subsequent counterclockwise rotation of lock wheel 10, thereby allowing relative rotation between the frame 32 and wheel 10.

The ratchet teeth 44 on the surface 18 of the void 16 and the pawl members 46 on the outer edge 24 of the ball housing 22 are designed so that the lock wheel 10 may rotate independently of the ball housing 22 in the clockwise direction but not in the counterclockwise direction. When the three indentations 20 of the lock wheel 10 are so aligned with the three holes 26 of the ball housing 22, the inflexible balls 30 are free to disengage from the three grooves 38 of the frame 32 as previously described.

FIGS. 5 and 6 show the lock mechanism following the second step of the unlocking process. The lock wheel 10 has rotated 240° counterclockwise from the position in FIG. 4, so that the notch 36 in the outer portion 12 of the lock wheel 10 is now aligned with the latch member 34. The lock mechanism is thus fully unlocked.

When the lock wheel 10 rotates in counterclockwise direction, the ratchet teeth 44 and the mating pawl members 46 cause the ball housing 22 to rotate with the lock wheel 10. Hence, the ball housing 22 and the balls 30 have been rotated 240° counterclockwise at the point where the latch drops into the notch.

FIGS. 7 and 8 show the lock mechanism after it has been reset to the lock position from the fully unlocked position of FIGS. 5 and 6. The lock wheel 10 has rotated 150° clockwise. The ratchet teeth 44 and pawl member 46 again allow the lock wheel 10 to rotate in the clockwise direction independently of the ball housing 22 and balls 30.

The stepper motor 42 provides rotation to the lock wheel 10 via the drive shaft 11, in precise 30° steps. A single electrical pulse to the stepper motor results in one 30° step of rotation. The stepper motor 42 is a four-phase stepper motor, so that the direction of rotation, clockwise or counterclockwise, is controlled according to the phase of the stepper motor to which the electrical pulse is supplied. Hence, for the 90° clockwise rotation of the lock wheel in the first step of the unlocking process, three pulses of electrical current are supplied to a clockwise phase of the stepper motor. For the 240° counterclockwise rotation of the lock wheel and ball cage in the second step of the unlocking process, eight electrical pulses are supplied to a counterclockwise phase of the stepper motor. Finally, when the lock mechanism is to be relocked from the fully unlocked position, the latch is lifted from the notch by means not shown and five electrical pulses are supplied to a clockwise phase of the stepper motor, so as to rotate the lock wheel 150° clockwise. The sequence of electrical pulses are supplied to the stepper motor via a module which may be loaded into the locking system just prior to missile launch, so as to further reduce possibility of accidental unlocking.

The lock mechanism allows for high speed unlocking, with each 30° rotational step requiring only 10 milliseconds. Hence, the entire two step unlocking process requires a total of 110 milliseconds. What this mechanism does is prevent random pulses in a electrical system from accidentally unlocking the trigger mechanism.

It will be appreciated that numerous changes and modifications may be made in the above described embodiments of the invention without departing from the inventive concept. Accordingly, the foregoing description is to be construed in an illustrative and not in a limitative sense, the scope of the invention being defined solely by the appended claims.

We claim:

1. Apparatus for unlocking a trigger mechanism comprising, an electrical motor mounted on a shaft, said shaft extending from said motor and having a ring coaxially mounted to rotate with said shaft, means for activating said motor by electrical impulses to rotate said shaft 30° in either direction, said wheel being located on said shaft adjacent a frame, a ball housing and a plurality of balls being disposed between the frame and wheel, said frame and wheel being spaced apart less than the diameter of said balls, grooves in said frame to receive said balls to prevent relative rotation between the housing and the frame, indentations in the wheel to receive the balls and allow said balls to drop from said grooves, a notch in the periphery of said wheel, a latch mounted adjacent the periphery of said wheel, said notch being configured to receive said latch upon the proper orientation of said wheel by said means for activating.

2. The apparatus of claim 1, including ratchet teeth on said wheel and a mating pawl on said ball housing.

* * * * *